Patented Oct. 12, 1926.

1,602,776

UNITED STATES PATENT OFFICE.

WILHELM NEELMEIER, OF LEVERKUSEN, NEAR COLOGNE, AND THEODOR NOCKEN, OF WIESDORF, NEAR COLOGNE, GERMANY, ASSIGNORS TO GRASSELLI DYESTUFF CORPORATION, OF NEW YORK, N. Y., A CORPORATION OF DELAWARE.

ALKYL-ARYLSULPHAMINONAPHTHOL SULPHONIC ACID AZO DYES.

No Drawing. Application filed February 3, 1925, Serial No. 6,658, and in Germany February 13, 1924.

We have invented new and useful improvements in azo dyestuffs of which the following is a specification.

Our invention consists in the use as coupling components of amino-naphthol-sulphonic acids substituted in a certain manner in the amino group and in the new azo dyestuffs obtained by this process.

The substitution of the amino groups in azo-dye components is generally accompanied by increased fastness properties, deeper shades or other valuable modifications of the characteristics of the colors. After the first attempts in this direction as shown for instance in dyestuffs of the type benzol-azo-acetylamino-8-naphthol-3-6-disulphonate of sodium more complicated acidylamino dyestuffs have been produced, we might only mention the important group of urea colors, the 2-benzoylamino-5-naphthol-7-sulphonic acid colors and as a more recent development in this line the dyestuffs in which the amino group is substituted by an aryl-sulpho radical. According to our invention we are now going one step further in this substitution and are also replacing the second hydrogen atom in the amino group of azo dye components. The coupling components which we now use are of the type alkyl-arylsulph-amino-naphthol-sulphonic acids:

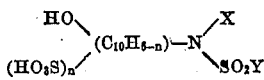

in which formula X is an alkyl group such as $CH_3$, $C_2H_5$, $C_2H_4OH$, $CH_2C_6H_5$, etc. and Y an aryl group such as $C_6H_5$, $C_6H_4CH_3$, $C_6H_3.OH.COOH$, etc. and $n$ is the numeral 1 or 2.

Compared with the corresponding colors from aryl-sulphamino-naphthol-sulphonic acids our new products are distinguished by still better fastness properties, especially increased fastness to chlorine, which is quite valuable when these dyestuffs are used for calico printing. The shades of our new products are more on the yellowish side of the color scale, which allows of a wider range of tints obtainable from the same class of dyestuffs having otherwise similar dyeing properties. The use of aryl-sulpho substituted amines as in the prior art is in itself of a technical advantage as it allows to introduce into the molecule radicals producing peculiar dyeing properties such as an ortho-hydroxy-carboxylic group; colors containing this group will dye on chrome mordanted wool and form very fast chromium lakes. The same technical advantages are also present in our new twice substituted amino compounds.

Though the diazo compounds with which our new alkyl-arylsulphamino-naphthol-sulphonic acids are combined, exercise their influence on the shade, solubility, etc., of our new dyestuffs, we have found that the increased fastness and change of coloristic properties is maintained in all cases where the second hydrogen atom in the aryl-sulphamino group is replaced by an alkyl group as specified above. For the purpose of our invention it is therefore immaterial if the alkyl-arylsulphamino-naphthol-sulphonic acids are coupled with the diazo compounds from mononuclear amines or from aminoazo derivatives or other more complicated amines.

Our new dyestuffs dye wool generally from red to blue fast shades; when using for instance alkyl-salicyl-sulphamino-naphthol-sulphonic acids as coupling components the products dye wool after chromed similar red to blue fast shades; they can also be used in conjunction with chrome acetate for cotton printing and the same shades, being exceedingly fast to chlorine and washing, are obtained.

In order to illustrate our invention further, the following examples are given, the parts being by weight. We wish it, however, to be understood that our invention is not limited to these specific examples nor to the conditions given therein.

*Example 1.*—391 parts 1-ethylamino-8-naphthol-3-6-di-sulphonate of sodium are dissolved in 2000 parts of water; 136 parts of crystallized sodium acetate and 190.5 parts of p-toluol-sulphochloride are added and the reaction carried out for several hours at 70–80° C. The completion of the reaction is shown when a sample of the solution does not react any more with nitrous acid. Should a test with nitrite of sodium in acid solution still show unreacted ethylamino-naphthol-sulphonic acid more sodium acetate and toluol-sulphochloride is added, until the reaction is complete. The obtained 1 - ethyl - p - toluolsulphamino - 8 - naphthol-3-6-disulphonate of sodium is exceedingly soluble in water and it is difficult to isolate same in pure form. The solution obtained as described can, however, be used as such.

137 parts of o-phenetidine are now diazotized in the usual manner and the diazo solution is run into the solution of 1-ethyl-p - toluolsulphamino - 8 - naphthol-3-6-disulphonate of sodium obtained as above and cooled to about 0° with ice, adding 106 parts of soda ash. The coupling is finished in a few hours. The dyestuff is thrown out of solution by the addition of salt, filtered and dried. It is in form of its sodium salt a dark red powder, soluble in water with a reddish blue color, soluble in concentrated sulphuric acid with a violet-red color; it dyes wool very level, clear, bluish red shades, fast to milling. In its free form the dyestuff has most probably the formula:

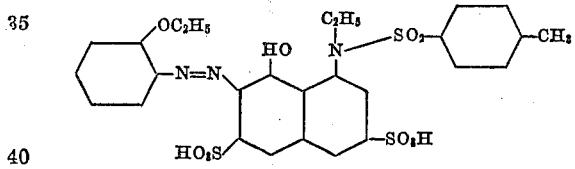

*Example 2.*—253 parts of 2-methylamino-8-naphthol-6-sulphonic acid are dissolved and neutralized in 2000 parts of water by the addition of 53 parts soda ash. 136 parts of crystallized sodium acetate are now dissolved in this solution and 236.5 parts of salicyl-sulphochloride gradually introduced within one hour. As the condensation proceeds the reaction product separates as fine, colorless crystals. The reaction is complete after about 8 hours' stirring at room temperature; if necessary, a small excess of salicylsulphochloride and sodium acetate is added. The 2-methyl-salicylsulphamino-8-naphthol-6-sulphonate of sodium forms small, colorless leaflets, easily soluble in hot water. The product as obtained is used in the preparation of our new azo dyestuffs.

297 parts of aniline-2-5-disulphonate of sodium are now diazotized in the usual manner. The diazo solution is run into a solution of 187.5 parts 3-amino-4-cresol ethylether in 1000 parts water. The acidity of the coupling reaction is neutralized with sodium acetate, the combination is complete after 24 hours, it is acidified, salted out hot and filtered. The monoazo color so obtained is dissolved in 3000 parts of soda ash solution, 69 parts nitrite of sodium added and the whole run into 250 parts muriatic acid 19½° Bé. and 500 parts water cooled to 10°. This second diazotation is finished when a sample made alkaline does not turn purple after addition of mineral acid.

The diazo solution so obtained is quickly introduced into a solution of 475 parts of 2-methyl-salicyl-sulphamino-8-naphthol-6-sulphonate of sodium prepared as above, dissolved in 2000 parts of water with 175 parts of soda ash. The combination proceeds rapidly. The dyestuff is salted out, filtered off and dried. In its free form the dyestuff has most probably the formula:

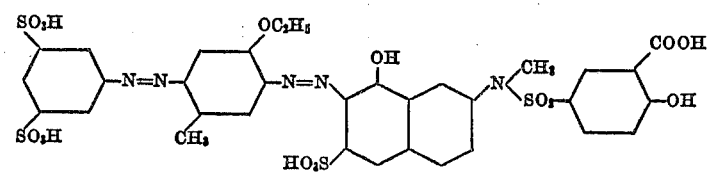

It is bronzy, bluish violet powder, soluble in water with a bluish violet color, soluble in concentrated sulphuric acid with a blue color. It dyes wool in an acid bath bluish violet shades, which are not much changed by afterchroming; printed on cotton with chrome acetate it produces bluish violet shades of excellent fastness to chlorine and washing.

We claim:—

1. The process of producing new azo dyestuffs which consists in combining diazotized aromatic amines with alykl-arylsulphamino-naphthol-sulphonic acids, substantially as described.

2. The process of producing new azo dyestuffs which consists in combining diazotized aromatic amines with 1-alkyl-arylsulphamino-8-naphthol-3-6-disulphonic acids substantially as described.

3. The process of producing a new azo dyestuff which consists in combining diazotized o-phenetidine with 1-ethyl-paratoluolsulphamino-8-naphthol-3-6-disulphonic acid substantially as described.

4. As new products the azo dyestuffs which are substantially identical with the dyestuffs obtainable by combining diazotized aromatic amines with alkyl-arylsulphamino-naphthol-sulphonic acids, which dyestuffs are dark red to blue powders, soluble in water with from red or blue color and dyeing wool from an acid bath from red to blue fast shades.

5. As new products the azo dyestuffs which are substantially identical with the dyestuffs obtainable by combining diazotized aromatic amines with 1-alkyl-arylsulphamino-8-naphthol-3-6-disulphonic acids, which dyestuffs are dark red powders, soluble in water with from red to blue colors, soluble in concentrated sulphuric acid with a violet-red color and dyeing wool in an acid bath from red to blue fast shades.

6. As a new product the azo dyestuff which is substantially identical with the dyestuff obtainable by combining diazotized o-phenetidine with 1-ethyl-paratoluolsulphamino-8-naphthol-3-6-disulphonic acid having most probably the formula:

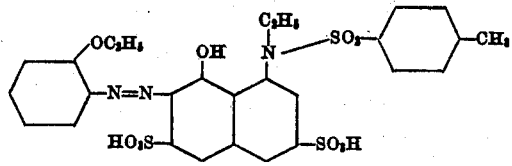

which dyestuff is a dark red powder, soluble in water with a bluish red color, soluble in concentrated sulphuric acid with a violet-red color and dyeing wool in an acid bath red, fast shades.

In testimony whereof we have hereunto set our hands.

WILHELM NEELMEIER.
THEODOR NOCKEN.